United States Patent

[11] 3,556,302

| [72] | Inventor | Edward A. Agranat |
| --- | --- | --- |
| | | Weston, Mass. |
| [21] | Appl. No. | 797,071 |
| [22] | Filed | Jan. 6, 1969 |
| [45] | Patented | Jan. 19, 1971 |
| [73] | Assignee | Amicon Corporation |
| | | Lexington, Mass. |
| | | a corporation of Massachusetts |

[54] FILTRATION APPARATUS HAVING FLOW DISTRIBUTOR
6 Claims, 6 Drawing Figs.

[52] U.S. Cl. .................................................. 210/321,
210/356, 210/433, 210/445, 210/450, 210/456
[51] Int. Cl. ...................................................... B01d 31/00
[50] Field of Search ........................................... 210/22, 23,
321, 350, 356, 433, 434, 445, 446, 450, 456, 343, 344

[56] References Cited
UNITED STATES PATENTS

| 3,285,421 | 11/1966 | McKelvey, Jr., et al. | 210/433X |
| --- | --- | --- | --- |
| 3,361,261 | 1/1968 | Fairey et al. | 210/446X |
| 3,398,834 | 8/1968 | Nuttall et al. | 210/321 |

*Primary Examiner*—Frank A. Spear, Jr.
*Attorney*—R. W. Furlong

ABSTRACT: Apparatus useful for carrying out reverse osmosis, ultrafiltration or other filtration processes wherein it is desirable to transport liquid in a predetermined path over a filter at an elevated operating pressure, said apparatus comprising an ultrafiltration cell formed of two deflection-resistant plates and a flow-distributing means between said plates which flow-distributing means is maintained in intimate contact with the face of a filter by a hydraulic pressure difference maintained across said distributor plate. This pressure assures that any deflection of the aforesaid plates is compensated for by a matching deflection of the distributor plate and thereby avoids short circuiting of the desired flow path between the plate and the membrane surface.

PATENTED JAN 19 1971
3,556,302
SHEET 1 OF 2
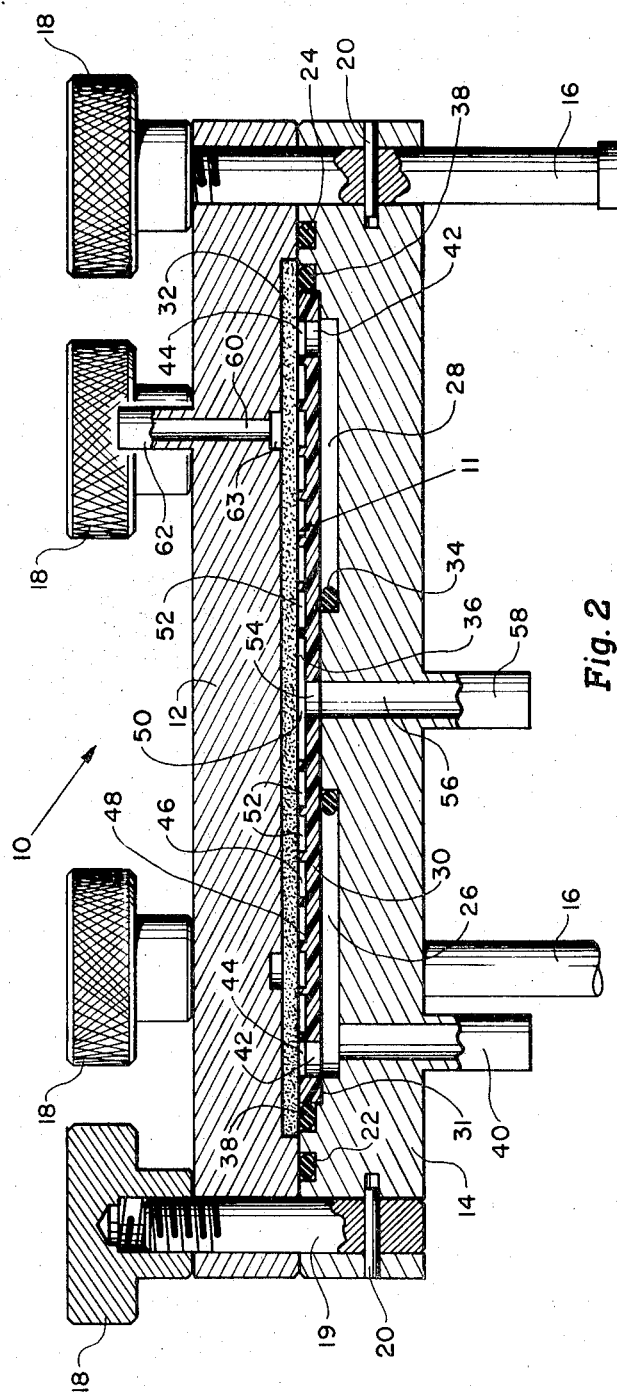
Fig. 2
Fig. 1
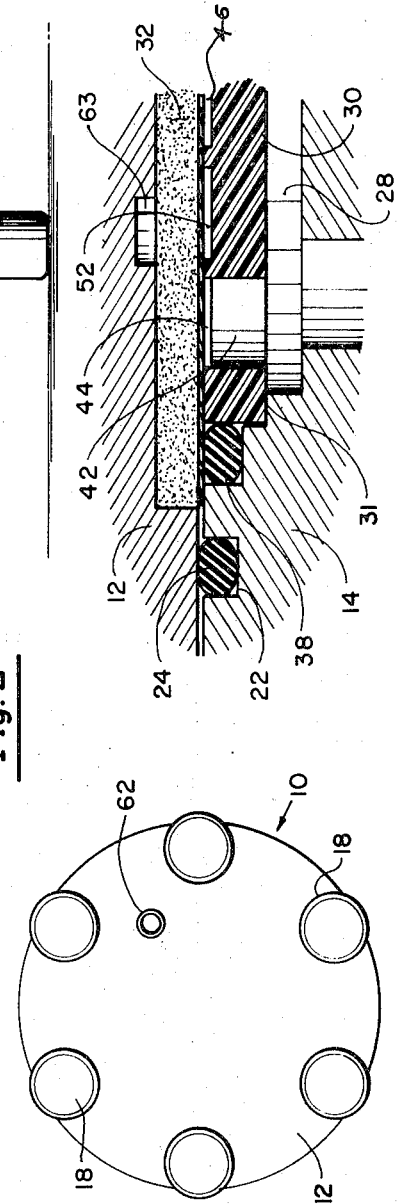
Fig. 3
EDWARD A. AGRANAT
*INVENTOR*
BY
ANDREW F. KEHOE
*ATTORNEY*

FILTRATION APPARATUS HAVING FLOW DISTRIBUTOR

BACKGROUND OF THE INVENTION

It is often desirable to process fluids continuously through apparatus at elevated pressures. When such operations are to be carried out, it becomes a problem to (1) assure that the processing apparatus does not develop external leakage and (2) assure that the internal flow paths of the liquid being processed do not become short circuited in such a way as to allow the feed stream to take a flow path other than that desired. It is, of course, highly desirable to achieve these ends with the least cumbersome apparatus as is practical. Generally, the apparatus should be easily cleanable, as compact as possible, and as light in weight as possible. Most of these factors are particularly important when the fluid being processed is likely to be of high economic value such as the liquids normally subjected to ultrafiltration and other such separative processes.

It has been conventional to use ultrafiltration membranes in well-stirred batch cells, i.e. cells wherein the solution to be ultrafiltered is constantly stirred by an agitating device riding just above the membrane surface. Such well-stirred batch wells are entirely satisfactory for concentration or fractionation of many solutions on a laboratory batch scale. However, two fundamental aspects of ultrafiltration processing work directly against the use of such cells are continuous, high flow rate, operations:

1. Macromolecules have relatively low diffusion rates and thereby tend to concentrate at the filtering face of the membrane, where the agitation is relatively ineffective, rather than back diffuse into the body of solution being ultrafiltered.
2. The relatively high flow rates possible through pore flow ultrafiltration membranes tend to promote the concentration of macromolecules still further, i.e. to accentuate the movement of molecules to the surface of the membrane and, at the same time, to slow further back diffusion from the membrane surface.

These two effects combine to form a so-called concentration polarization effect of the macromolecular solute at the membrane surface. This effect is at its worst when the solute reaches such a concentration that it forms a gel-type film; such a film usually effectively stops the operation of the hydraulically moderated ultrafiltration process and can slow the membrane throughput to virtually that obtainable with diffusion-type membranes, e.g. those ultratight membranes used in saline water purification. Moreover, this gel can effectively block the passages in the membrane barrier skin which passages determine the effective pore size of the membrane. When this occurs, some molecules which are desirably passed through the membrane will be retained on the upstream side thereof.

For these reasons, it has been found more desirable to utilize so called "thin channel techniques" wherein the ultrafiltration is carried out by causing a solution to be filtered to flow across a membrane surface in a controlled pattern and under conditions of nonturbulent, or laminar, flow. However, the manufacture of practical, economic apparatus for carrying out such thin channel processes presented problems. In particular, it has been difficult to provide units which can be repeatedly assembled and disassembled by personnel of limited technical training without premature damage to the sealing mechanisms. Moreover, it has been a problem to provide apparatus wherein the desired "thin channel" flow path can be maintained under significant operating pressures without short circuiting a flow from one part of the path to another. This problem has been especially troublesome with respect to apparatus having a convenient plate-type construction which can be easily adapted for use with a variety of readily available membranes.

SUMMARY OF THE INVENTION

Therefore, it is an object of the invention to provide improved apparatus for processing fluids under pressure.

It is a further object to provide an improved apparatus for use in ultrafiltration wherein the fluid to be ultra filtered is to be transported over the filter face of the membrane in a predetermined flow path.

A further object of the invention is to provide an ultrafiltration apparatus comprising an ultrafiltration cell formed of disclike retaining plates, which cell may be operated with predetermined fluid flow paths across the membrane surface even under pressures capable of causing some deflection of the aforesaid retaining plates.

Still another object of the invention is the provision of an ultrafiltration apparatus wherein the flow path of fluid over a membrane surface may be quickly and easily changed in accordance with the requirements of a particular process.

Another object of the invention is to provide a process whereby a predetermined flow path may be retained in an ultrafiltration cell of the type described even though elements from which the cell are formed suffer some deflection when ultrafiltration processing is carried out therein.

Other objects of the invention will be obvious to those skilled in the art on reading the instant specification.

The above objects have been substantially accomplished by construction of apparatus comprising an ultrafiltration cell, generally formed of two disclike retaining plates and containing therewithin a membrane, and a flow distribution plate therefor. A particular feature of the invention is that a hydraulic pressure differential across the distribution plate be used to press the distribution plate against the membrane surface in order to avoid any short circuiting of the intended fluid flow path. In order to achieve this effect, with desirably thin distribution plates it is necessary that the distributing plate be subject to as great a deflection under pressure as are the retaining plates. To achieve this, it is usually necessary to form the distribution plate from a low modulus material, for example a thermoplastic or thermosetting resin.

In the more favorably embodiments of the invention, the flow distribution plate is removably mounted in the ultrafiltration cell and replaceable with distribution plates having different flow path configurations. This feature greatly adds to the versatility of the apparatus by making it convertible to handle filtration of fluids having different flow characteristics which fluids may require flow paths of different lengths or cross sections in order to maintain operating parameters such as velocity, pressure and rate of ultrafiltrate recovery at acceptable levels.

ILLUSTRATIVE EMBODIMENT OF THE INVENTION

In this application and accompanying drawings we have shown and described a preferred embodiment of our invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

FIG. 1 shows a plan view of an ultrafiltration apparatus of the invention.

FIG. 2, shown on a larger scale than FIG. 1, is an elevational view, partly in section, of the apparatus of FIG. 1.

FIG. 3, shown on a larger scale than FIG. 2, shows more detail of the ultrafiltration cell and the situation of the membrane in the cell.

Figure 4:
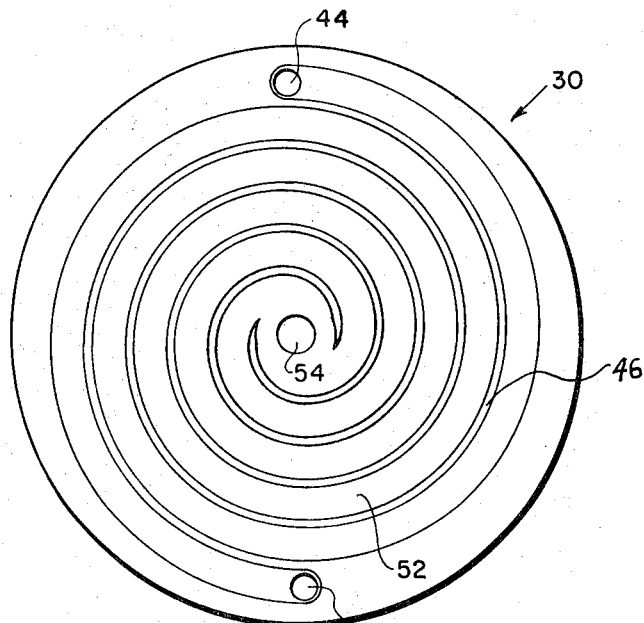
FIGS. 4 and 5 show plan views of typical flow directing means useful with the apparatus of the invention.

Referring to FIGS. 1 and 2 it is seen that an ultrafiltration apparatus 10 comprises an ultrafiltration cell 11 formed of an upper retaining plate 12 and a lower retaining plate 14, each said plate being formed of stainless steel. Apparatus 10 is mounted on support legs 16 which are threaded at the upper end thereof to provide, with nuts 18, means whereby plates 12 and 14 may be securely clamped together. There are additional clamping nuts 18 on threaded studs 19 as required. Pins 20 are used to lock legs 16 and studs 19 into retaining plate 14 and thereby permanently position plate 14 with respect to legs 16.

Lower plate 14 comprises a groove 22 for receiving an O-ring seal 24 which serves the purpose of sealing against leakage of liquid between plates 12 and 14. Lower plate 14 also comprises a major recess 26 which includes, reading bottom to top on FIG. 2, an inlet fluid zone 28, a flow distributor plate 30, and a membrane support member 32. When the apparatus is in use recess 26 also comprises a thin membrane which is mounted between distributor plate 30 and support member 32. Distributor plate 30 is mounted on a shoulder 31 and the membrane is held, around its periphery by being sealed between upper plate 12 and member 32 on the top thereof and lower plate 14 and distributor plate 30 on the bottom thereof. The membrane is assembled with its filter face, i.e. upstream side of the membrane, facing downwardly in the illustrated embodiment of the invention. Detail of this assembly is seen more clearly in FIG. 3. Also included within recess 26 is (1) an O-ring sealing means 34 which is situated in inlet fluid zone 26 and forms means to maintain inlet fluid from leaking between plate 14 and distributor plate 30 into an ultrafiltrate outlet 36, and (2) an O-ring sealing means 38 which forms means to keep the membrane sealed against membrane support member 32 and to facilitate a tight, biased seal formed by membrane support member 32 and lower retaining plate 14 with the membrane itself sealed therein.

The liquid flow through the above-described apparatus may be described as follows:

A liquid to be ultrafiltered (e.g. a 1 percent albumin solution from which the albumin is to be removed by use of an anisotropic ultrafiltration membrane of the type sold under the trade designation DIAFLO XM-50 by Amicon Corp.) is pumped, under a 50 p.s.i.g. operating pressure, into inlet port 40 wherein it flows into inlet fluid zone 28, thence through vertical conduits 42 of distributor plate 30. Referring to FIGS. 2—4, it is seen that distributor plate 30 comprises two fluid inlet ports 44. The inlet fluid comes through ports 44 and thereupon follows a spiral path 46 along the upper surface 48 of distributor plate 30 to outlet port 50 in the center of plate 30. Spiral path 46 is discernible in FIG. 2 as grooves 52 and forms a fluid conduit between the filter face of the membrane and plate 30.

On entering port 50, liquid is removed through a center port 54 in distributor plate 30, a center port 56 in plate 14 and thence through a conduit 58 from which it may be recycled or otherwise processed. It is important to realize that the liquid so recycled has not been through the membrane and is still part of the process flow stream, although it is more concentrated with respect to albumin because of the loss of albumin-free liquid through the membrane surface.

Ultrafiltrate which does go through the membrane surface enters porous membrane support member 32 and thereupon exits through a conduit 60 in plate 12 and exit ports 62. The wetted surface of plate 12 usually contains a system of grooves 63 to facilitate the passage of ultrafiltrate into conduit 60.

Figure 5:
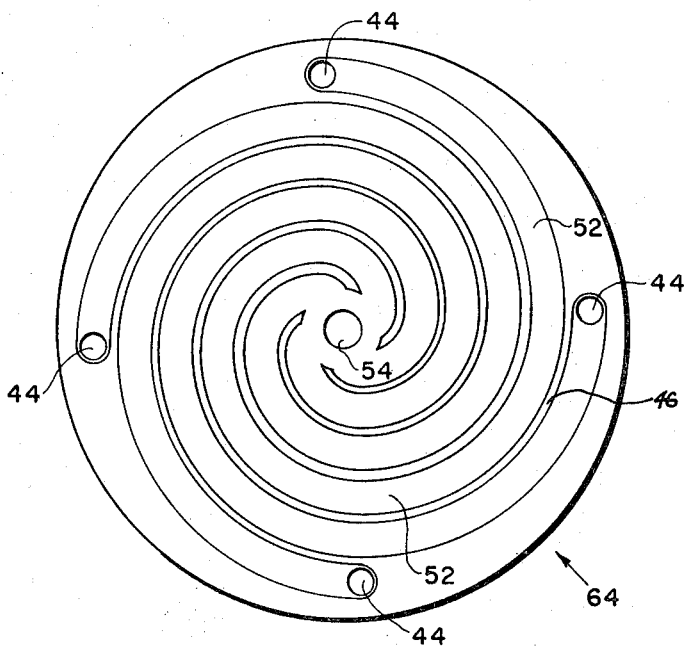

FIG. 5 shows a distributor plate 64 an alternative spiral flow design wherein four inlet ports 44 are used instead of only two such ports.

Figure 6:
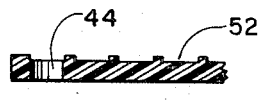
FIG. 6 shows a partial cross section of the means shown in FIG. 3.

FIG. 6 shows a partial cross section of the distributor plate on FIG. 5.

In use, the pressure drop across the spiral flow path 46 is sufficient to provide a significant pressure differential between inlet fluid zone 28 and outlet conduit 58, the higher pressure, of course, being exerted on the entire exposed bottom surface of distributor plate 30. The distributor plate is suitably constructed, as to material of construction and thickness, so that it is deflected to a sufficient degree that is always pressed against the membrane face even though upper retaining plate 12 is deflected by the pressure within the ultrafiltration cell proper. Of course, the membrane itself and its porous support plate are conventionally formed of easily deflectable construction so they also follow closely any deflection of retaining plate 12.

Retaining plates 12 and 14 will be formed of a deflection-resistant material, preferably a very high modulus material like steel so that they may be of about the relatively thickness shown in the drawings. In order to assure operation over reasonably versatile range of pressure conditions, the distribution plate must be capable of deflection by a considerably lower pressure than is necessary to deflect the retaining plates. For example the pressure differential acting on the distributor plate will usually be only a fraction of the operating pressure across the entire ultrafiltration cell. Moreover, the amount of surface acted upon by this lower pressure differential is less than the area of the retaining plates acted upon by the cell pressure. Therefore, to assure sufficient deflection of the distribution plate under such conditions, it is desirable to manufacture it out of a relatively low modulus material such as a thermoplastic or thermosetting resin of the type known in the art.

The most suitable metals have a modulus of over about 20 million p.s.i., preferably from 24 to 30 million p.s.i. in the unfilled state and usually have a far lower value. Those skilled in the art will be able to select any number of suitable materials on reading this disclosure but stainless steel and thermosetting resins such as the polyester and alkyl compounds, or the diallyl phthalate molding compounds, are preferred materials.

The so-called thin channel in the flow distributing plate, defined by spiral path 46 in FIG. 2, is one-quarter inch wide and 0.010 mils thick in the illustrated embodiment. In practice, it is most advantageous that the thin channel be from about 0.003 to 0.033 in height and from 0.05 to 0.50 inches in width.

I claim:

1. Filtration apparatus comprising a pair of retaining plates having between them a distributor plate and filter element mounted in face-to-face contact, and a porous support member in contact with the face of said filter element opposite the distributor plate, means for clamping said plates, filter element and support member together in sealed relation around their margins only forming a fluid tight cell;

the face of said distributor plate in contact with the filter element having an elongated shallow groove for conducting fluid across the face of said filter element;

an inlet for introducing fluid to be filtered under pressure into the space between said distributor plate and the adjacent retaining plate;

a conduit connecting said space to one end of said groove;

an outlet for withdrawing from said porous support member filtrate passing from said groove through said filter element; and a second outlet for withdrawing from said groove remote from said conduit fluid which does not pass through said filter element.

2. Apparatus as claimed in claim 1 wherein said distributor plate is formed of a polymeric resin having a modulus below $1 \times 10^6$ p.s.i. and said retaining plates are formed of a metal having a modulus above $20 \times 10^6$ p.s.i.

3. Apparatus as claimed in claim 1 wherein said filter element is a membrane of the type used in ultrafiltration or reverse osmosis processes.

4. Apparatus as claimed in claim 3 wherein the groove in said distributor plate and the opposing face of said membrane form a conduit from 0.003 to 0.033 inch in height and from 0.05 to 0.50 inch in width.

5. Apparatus as claimed in claim 3 wherein said groove is in the form of a spiral.

6. Apparatus as claimed in claim 5 in which the face of said distributor plate in contact with the filter element has a plurality of elongated shallow grooves, a conduit connects said space to one end of each of said grooves, and an outlet withdraws from each groove remote from the conduit end fluid which does not pass through said filter element.

UNITED STATES PATENT OFFICE
CERTIFICATE OF CORRECTION

Patent No. 3,556,302  Dated January 19, 1971

Inventor(s) Edward A. Agranat

It is certified that error appears in the above-identified patent and that said Letters Patent are hereby corrected as shown below:

Column 1, line 25, "wells" should read -- cells --; line 29, "are" should read -- for --; line 71, "a" should read -- of --. Column 2, lines 10 and 11, "dis-clike" should read -- disc-like --; line 28, "disclike" should read -- disc-like --; line 41, "favorably" should read -- favorable --. Column line 29, after "30 million psi." insert -- The useful resins have a modulus of less than 1 million psi --.

Signed and sealed this 11th day of May 1971.

(SEAL)
Attest:

EDWARD M. FLETCHER, JR.
Attesting Officer

WILLIAM E. SCHUYLER, J.
Commissioner of Patent